United States Patent [19]
Yoshikawa et al.

[11] Patent Number: 5,815,139
[45] Date of Patent: Sep. 29, 1998

[54] RELATIVE MANIPULATED VARIABLE INPUT DEVICE

[75] Inventors: Osamu Yoshikawa; Takayuki Mizuki, both of Tokyo, Japan

[73] Assignee: SMK Corporation, Tokyo, Japan

[21] Appl. No.: 848,669

[22] Filed: Apr. 29, 1997

[30] Foreign Application Priority Data

May 1, 1996 [JP] Japan .................................... 8-132570

[51] Int. Cl.⁶ ..................................................... G09G 5/08
[52] U.S. Cl. ........................... 345/157; 345/160; 345/168
[58] Field of Search .................................. 345/157, 159, 345/160, 168, 173, 174

[56] References Cited

U.S. PATENT DOCUMENTS

| | | | |
|---|---|---|---|
| 4,654,647 | 3/1987 | Wedam | 345/160 |
| 4,736,191 | 4/1988 | Matzke et al. | 345/157 |
| 4,887,230 | 12/1989 | Noguchi et al. | 345/157 |
| 4,983,786 | 1/1991 | Stevens et al. | 345/159 |
| 5,287,089 | 2/1994 | Parson | 345/157 |
| 5,563,629 | 10/1996 | Caprara | 345/160 |

Primary Examiner—Richard A. Hjerpe
Assistant Examiner—Tracy H. Nguyen
Attorney, Agent, or Firm—Armstrong, Westerman, Hattori, McLeland & Naughton

[57] ABSTRACT

The present invention concerns a relative manipulated variable input device which is capable of controlling the cursor movement in correspondence to the direction and amount of tilt of a control button and controlling the speed of the cursor movement in accordance with the force applied to the control button as well. Output data is generated using relative position data calculated from the difference between a pressed position and a reference position and a contact resistance value $r_p$. The output data, which represents the direction and amount of tilt of the control button, is output in accordance with the force applied to the control button. The relative position data represents the direction and amount of tilt of the control button and the output data is produced based on the relative data. Hence, the cursor movement can be controlled by the direction and amount of tilt of the control button, and by changing the force exerted on the control button to change the contact resistance value $r_p$, different output data corresponding to the force exerted on the control button can be provided even if the direction and amount of tilt of the control button are held unchanged.

2 Claims, 5 Drawing Sheets

| | X | Y |
|---|---|---|
| (1) | C' (X1-X0) | C' (Y1-Y0) |
| (2) | C' (X2-X0) | C' (Y2-Y0) |
| (3) | C' (X3-X0) | C' (Y3-Y0) |
| (4) (5) | C' (X4-X0) | C' (Y4-Y0) |

Fig.7(b)
PRIOR ART

RELATIVE MANIPULATED VARIABLE INPUT DEVICE

BACKGROUND OF THE INVENTION

1. Field of the Invention

The present invention relates to a relative manipulated variable input device which provides output data representing a relative manipulated variable to move, for instance, a cursor or similar on the display of a personal computer.

2. Description of the Prior Art

As input devices for relative manipulated variables for moving the cursor on the display of a personal computer, a touch pad is known, rather than a mouse, because a touch pad is easily portable and does not take up much space on the move. The touch pad or panel is a device that detects each position of a pressure or force applied to a tablet sheet through utilization of the principle of operation of a tablet or digitizer and produces output data representing a relative manipulated variable on the basis of the difference between respective force-exerted positions on the tablet sheet.

Because there is a demand for downsizing the conventional touch pad, however, the tablet sheet pressing area is so small that the tablet sheet pressing operation for continuous control of cursor movements needs to be done in a plurality of steps.

To overcome such a disadvantage of the prior art, the inventor of this application has proposed in Japanese Pat. Appln. No. 206736/95 a pointing device as a relative manipulated variable input device that enables the tablet sheet pressing operation to be performed in a single step even if the tablet sheet pressing area is small.

The pointing device will be described below with reference to FIGS. 5 through 7.

Figure 5:
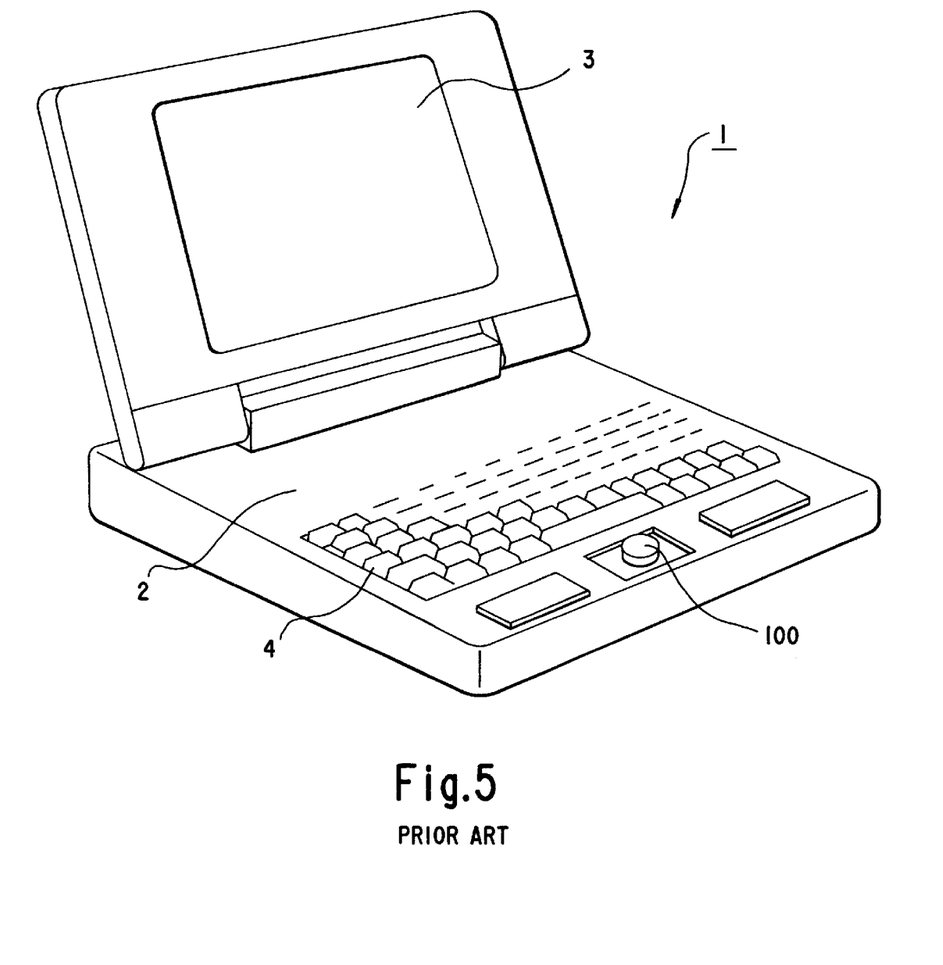
FIG. 5 is a perspective view of a personal computer 1 equipped with a pointing device 100 as a conventional relative manipulated variable input device.

FIG. 5 schematically shows a personal computer (hereinafter referred to as a PC) 1 equipped with a display 3 and a keyboard 4. Reference numeral 100 denotes a pointing device mounted on a keyboard housing 2.

As depicted in FIGS. 6(a)–6(d), the pointing device 100 is made up of a rigid plate 12 as of iron, a tablet formed by a pair of opposed tablet film sheets 60 and 61 supported by the rigid plate 12, and a control button 30 of synthetic rubber placed above the tablet sheet.

The control button 30 is a square, sheet-like member having the edge flange bent down about the periphery of the sheet for abutment against the peripheries of the tablet film sheets 60 and 61. The edge flange of the sheet-like control button 30 is held between the rigid plate 12 supporting the tablet film sheets 60 and 61 and the PC housing 2, by which the pointing device 100 is mounted on the housing 2 and the control button 30 is positioned above the tablet sheet (60, 61).

The flat central portion of the control button 30 has a columnar configuration of a size large enough to press by a user's finger. The columnar central portion of the control button 30 lies above a rectangular hole bored through the housing 2. The underside of the control button 30 forms a downward spherical surface. By tilting the control button 30 while pressing it as shown in FIGS. 6(c) and 6(d), the position of pressure being applied to the tablet sheet (60, 61) shifts in the direction in which the control button 30 is tilted.

The pointing device 100 detects the position of pressure applied to the tablet through utilization of its resistance contact scheme. The tablet film sheets 60 and 61 are coated uniformly over the entire areas of their opposed surfaces with resistance layers and they are held together but slightly spaced by insulating dot spacers (not shown) printed on their opposed surfaces.

By applying a position detecting voltage to one side electrode of each tablet film sheet and grounding its other side electrode, the tablet film sheet develops a potential at each position thereon in proportion to the distance from the electrode, forming a potential gradient all over the tablet film sheet. The position of pressure applied to each of the tablet film sheets 60 and 61 is detected by reading the potential at that position through the other tablet film sheet and calculating therefrom the pressed position.

Figure 6A:
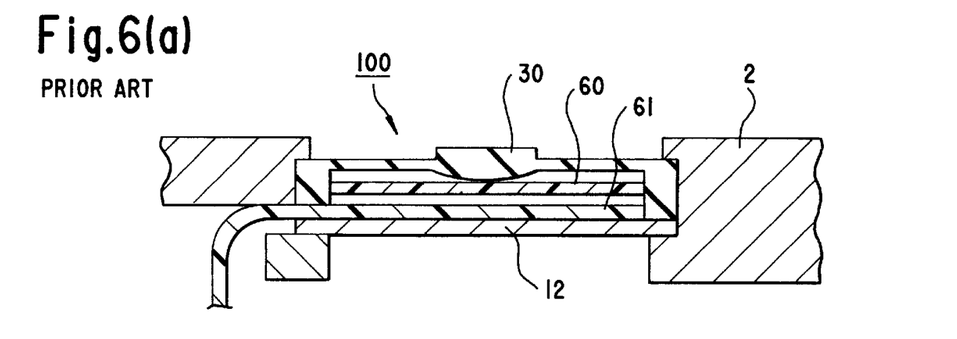
FIG. 6(a) through (d) are sectional views of the principal part of the conventional pointing device 100 for explaining its operations.
Figure 6B:
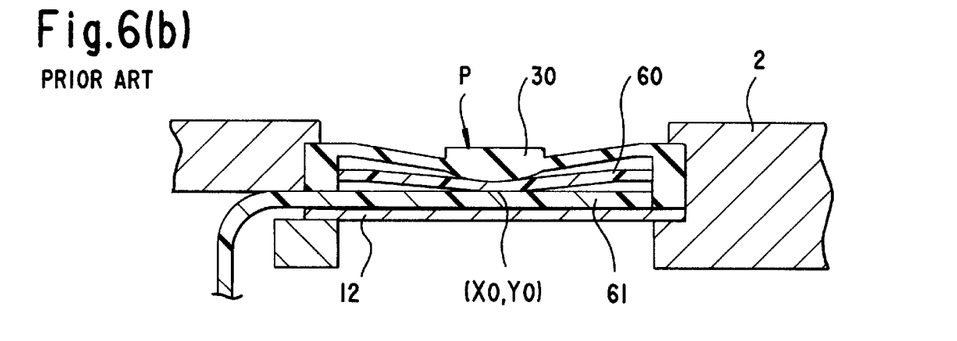
Figure 6C:
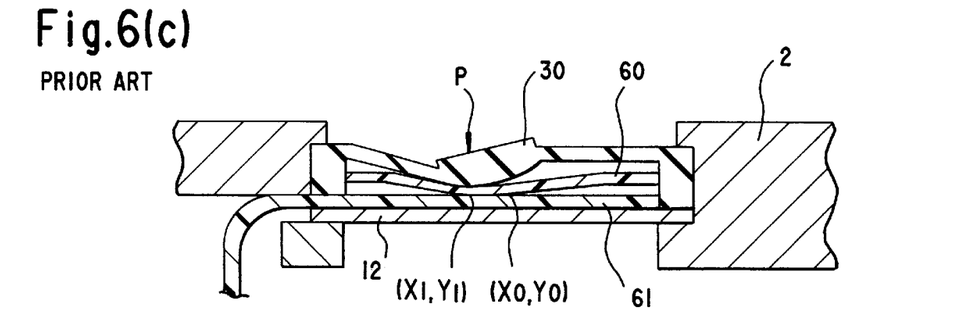
Figure 6D:
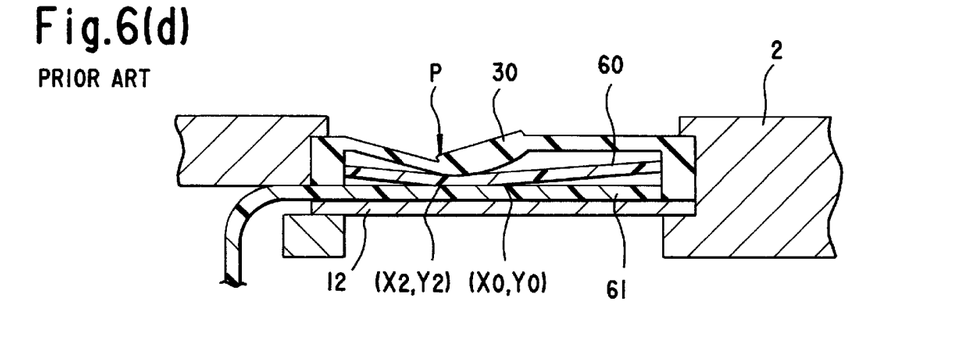

When the center of the control button 30 is depressed as shown in FIG. 6(b), the center of its spherical underside presses the tablet film sheet 60 and the position of the pressure applied thereto (hereinafter referred to as a pressed position) $(x_n, y_n)$ is stored as a reference position $(x_0, y_0)$.

Tilting the control button 30 as shown in FIG. 6(c), the pressed position $(x_n, y_n)$ on the tablet film sheet 60 shifts in the direction of tilt of the control button 30, because the underside of the button 30 is convexly spherical. The difference between the newly pressed position $(x_1, y_1)$ and the reference position $(x_0, y_0)$ is used to calculate relative position data $(x_1-x_0, y_1-y_0)$, which is multiplied by a predetermined constant C' to compute output data $(C'(x_1-x_0), C'(y_1-y_0))$ (see FIG. 7(b)).

When the output data $(C'(x_{1-x0}), C'(y_{1-y0}))$ is fed to the PC 1, the cursor on its display screen 3 moves to a point (1) in the same direction as that in which the control button 30 is being tilted. The distance of this cursor movement (the distance from the origin O to the point (1) is proportional to the relative position data $(x_1-x_0, y_1-y_0)$ contained in the output data, that is, in proportion to the distance between the reference position $(x_0, y_0)$ and the pressed position $(x_n, y_n)$. Accordingly, when the control button 30 is further tilted in the same direction to press the tablet sheet at a position $(x_2, y_2)$ farther from the reference position $(x_0, y_0)$ as shown in FIG. 6(d), the distance of the cursor movement (the distance between the points (1) and (2) becomes larger than the distance between the origin O and the point (1). That is, the speed of cursor movement can be controlled by the tilt of the control button 30.

The reference position $(x_0, y_0)$ is stored until the control button 30 is released from depression, and upon each detection of the pressed position $(x_n, y_n)$, it is compared with the reference position $(x_0, y_0)$ to compute relative position data.

Figure 7A:
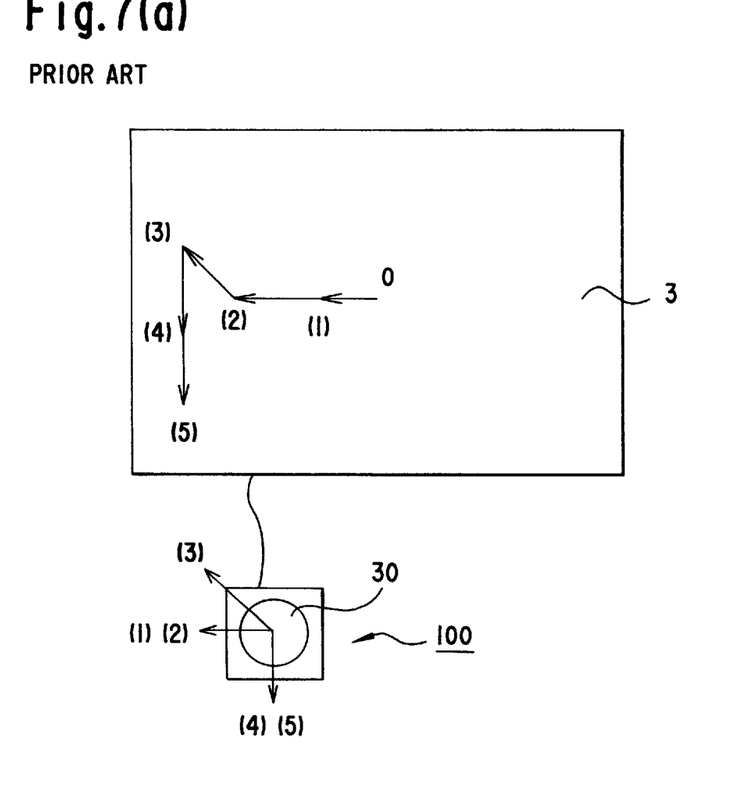
FIG. 7(a) is a diagram showing the relationship between the press-control operation of the control button 30 of the conventional pointing device 100 and the loci of cursor movements on a PC display screen 3.
Figure 7B:
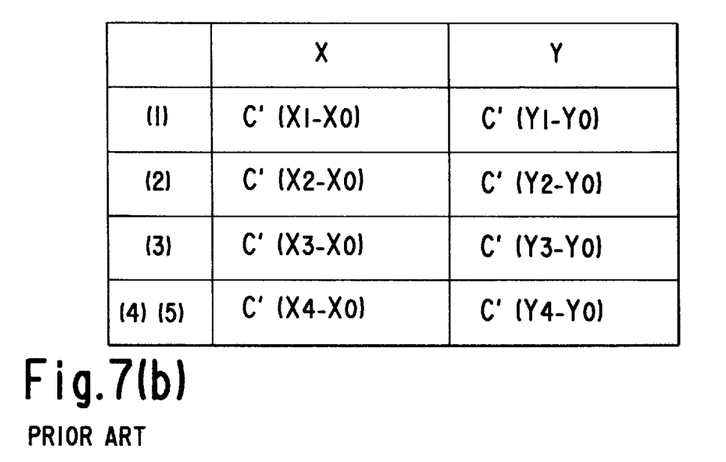
FIG. 7(b) is a table showing output data (X, Y) at each operating position of the conventional pointing device 100 in FIG. 7(a).

Hence, when the control button 30 is tilted next in a different direction (3) (see FIG. 7(a)), the newly detected position $(x_3, y_3)$ is used to calculate therefrom relative position data $(C'(x_3-x_0), C'(y_3-y_0))$ and, as depicted in FIG. 7(a), the cursor on the display screen 3 moves from the point (2) to (3) in the same direction as that of tilt of the control button 30.

Similarly, when tilting the control button 30 next in a direction toward a point (4), relative position data $(C'(x_4-x_0), C'(y_4-y_0))$ is calculated from the newly detected pressed position $(x_4, y_4)$ and the cursor on the display screen 3 moves from the point (3) to (4) in the same direction as that of tilt of the control button 30. The pressed position $(x_n, y_n)$ on the tablet film sheet 60 is periodically detected, so that, only by holding the control button 30 tilted in the direction of the point (4), output data containing the same relative position data $(C'(x_4-x_0), C'(y_4-y_0))$ is provided again and the cursor further moves from the point (4) to (5).

With the above-described relative manipulated variable input device 100, since the cursor movement is always controlled by the output data that is obtained by comparing each pressed position with the reference position $(x_0,y_0)$, the press-control operation can be performed continuously even if the operation area of the tablet is small. Furthermore, the cursor movement can be controlled corresponding to the direction and amount of tilt of the control button 30.

In the case of moving the cursor faster, however, an operator does not always tilt the control button but instead, he may sometimes press the control button with more force.

For example, in the case of moving the cursor faster in the direction (1) by pressing the control button 30 at the position $(x_1,y_1)$ as shown in FIG. 6(c), the operator presses the control button 30 hard, rather than further tilts it. Since the pressed position $(x_1,y_1)$ will not be shifted only by increasing the force to the control button 30, however, the speed of the cursor movement will remain unchanged. Hence, the speed of the cursor movement cannot be controlled by such a press-control operation. Therefore, the pointing device 100 is considered to lack operability as a relative manipulated variable input device.

SUMMARY OF THE INVENTION

It is therefore an object of the present invention to provide a relative manipulated variable input device which is capable of controlling the cursor movement in correspondence to the direction and amount of tilt of the control button and controlling the speed of the cursor movement in accordance with the force exerted on the control button.

A relative manipulated variable input device according to a first aspect of the present invention comprises: a tablet sheet formed by a pair of opposed tablet film sheets disposed in parallel with a very small gap defined therebetween; a control button disposed above the tablet sheet so that, when tilted in a desired direction while being depressed, the control button presses the tablet sheet continuously at different positions; position detecting means for detecting, as a pressed position $(x_n,y_n)$, the position of contact between the pair of tablet film sheets by the depression of the control button; contact resistance detecting means for detecting a contact resistance value $r*AD_p$ at the pressed position $(x_n,y_n)$; and reference position setting means for storing a first pressed position of the tablet sheet as a reference position $(x_0,y_0)$ at least until the force applied to the control button is removed. Output data is generated using relative position data calculated from the difference between the pressed position $(x_n, y_n)$ and the reference position $(x_0,y_0)$ and the contact resistance value $r_p$. The output data, which represents the direction and amount of tilt of the control button, is provided in accordance with the force exerted on the control button.

Upon depression of the control button, the position of its first contact with the tablet sheet is set as the reference position $(x_0,y_0)$. By tilting the control button in a desired position while pressing it, the tablet sheet is pressed continuously at different positions, and the contact resistance value $r_p$ at each pressed position $(x_n,y_n)$ is detected. The relative position data, calculated from the difference between the pressed position $(x_n,y_n)$ and the reference position $(x_0,y_0)$, represents the direction and amount of tilt of the control button, and since the output data is generated from such relative position data, the cursor movement can be controlled using the direction and amount of tilt of the control button.

Further, the contact resistance value $r_p$ at the pressed position $(x_n,y_n)$ is also used for the generation of the output data, so that, by changing the strength of force exerted on the control button to change the contact resistance value $r_p$, difference output data corresponding to the force applied to the control button can be provided even if the direction and amount of tilt of the control button remain unchanged.

According to a second aspect of the invention, the output data is produced by multiplying the relative position data by a corrective constant C determined on the basis of the contact resistance value $r_p$.

Since the output data is generated by multiplying the relative position data by the corrective constant C, the amount of cursor movement which is controlled by the output data is in proportion to the corrective constant C. Since the corrective constant C is determined by the contact resistance value $r_p$, the speed of the cursor movement can be controlled also by changing the strength of force applied to the control button to change the contact resistance value $r_p$.

DESCRIPTION OF THE PREFERRED EMBODIMENT

A description will be given, with reference to the accompanying drawings, of the relative manipulated variable input device according to an embodiment of the present invention. Incidentally, the parts corresponding to those of the aforementioned conventional touch pad 100 are identified by the same reference numerals and no description thereof will be repeated.

Figure 1:
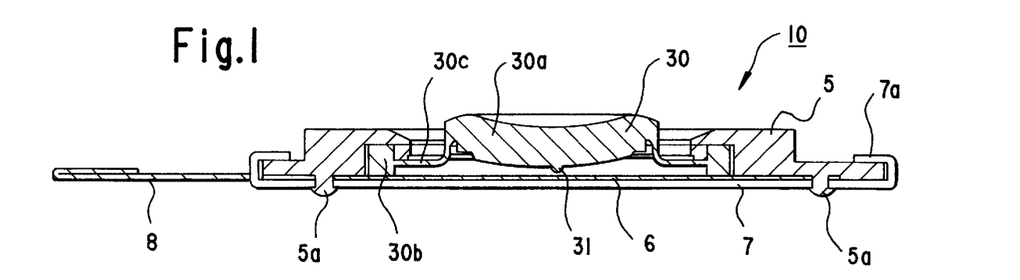
FIG. 1 is a sectional view illustrating the principal part of a pointing device 100 that is a relative manipulated variable input device according to an embodiment of the present invention.

FIG. 1 illustrates in section, the principal part of the pointing device 10 which is the relative manipulated variable input device according to an embodiment of the present invention. The control button 30 and the tablet film sheets 60 and 61 (indicated generally as a tablet sheet 6 in FIG. 1) are held by a housing 5 molded of synthetic resin and a rigid plate 7 secured to the bottom of the housing 5 so that the control button 30 and the tablet sheet 6 are supported in the housing 5. The rigid plate 7 has its marginal portion 7a folded over about the periphery of the housing 5. Further, bosses 5a protrusively provided on the underside of the housing 5 are inserted through the rigid plate 7 and fusion-bonded thereto.

The control button 30 is made up of a disc-shaped control key 30a, a ring-shaped support portion 30b and a thin elastic coupling portion 30c, which are integrally molded of synthetic resin. The control key 30a is supported by the elastic coupling portion 30c in a manner to be vertically movable in a cylindrical opening formed through the housing 5. When no force is exerted on the control key 30a as shown in FIG. 1, its underside lies above the tablet sheet 6. The top of the control key 30a is formed gently concave to allow ease in pressing it by the operator's finger. The underside of the control key 30a is spherical or convex so that when the control key 30a of the control button 30 is tilted while being pressed against the tablet sheet 6, the pressed position on the tablet sheet 6 continuously shifts in the direction of tilt of the key 30a. Reference numeral 31 denotes a lug slightly projecting from the underside of the control key 30a centrally thereof. When the control button 30 is not pressed as shown in FIG. 1, the tip of the lug 31 lies adjacent the tablet sheet 6.

The tablet sheet 6, formed by the pair of opposed tablet film sheets 60 and 61, is held on the rigid plate 7 and a connecting portion 8 extended from the tablet sheet 6 is electrically connected to a data processing part 20 (see FIG. 2) which performs operations including the detection of the pressed position on the tablet sheet 6 as described later on.

Figure 2:
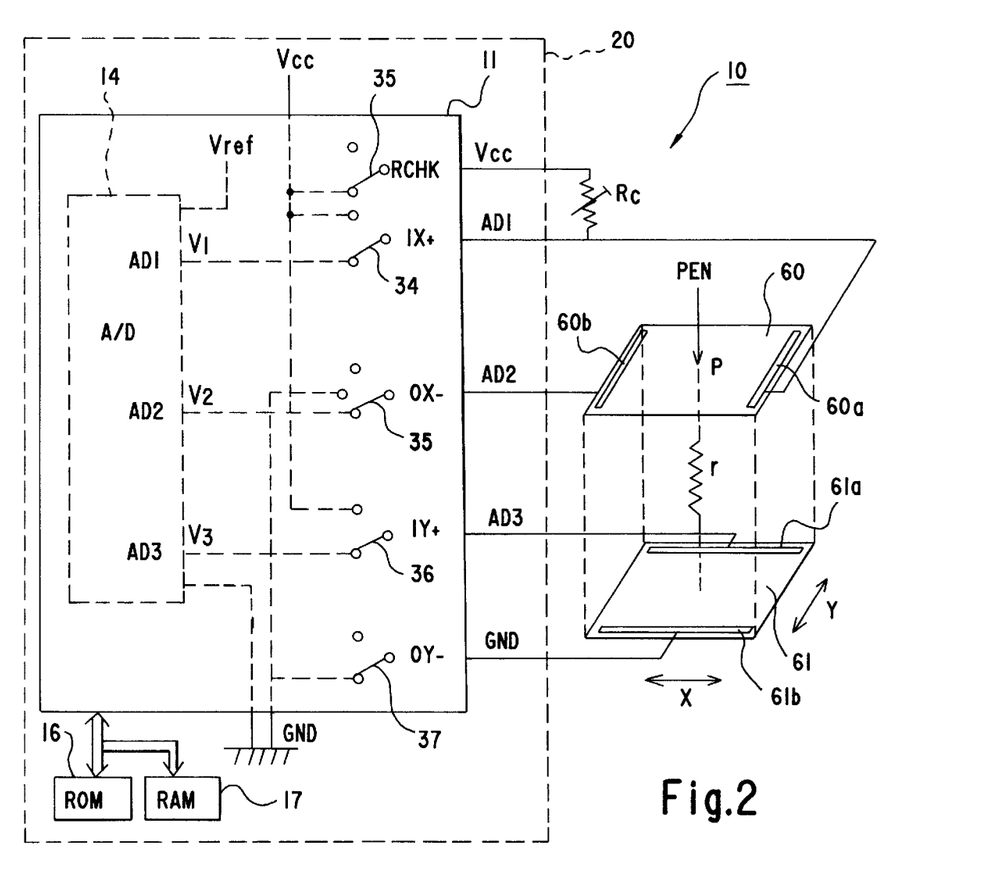
FIG. 2 is a circuit diagram showing a data processing part 20 and a tablet sheet 6.

FIG. 2 is a circuit diagram showing the configuration of the data processing part 20. A detailed description will be given of the detection of the pressed position $(x_n, y_n)$ on the tablet sheet 6 and the detection of a contact resistance value $r_p$ at that position.

The data processing part 20 is equipped with a microcomputer 11 having an A/D converter 14 built-in. The A/D converter 14 has three input terminals AD1, AD2 and AD3 and is adapted to simultaneously detect potentials at these input terminals.

The microcomputer 11 has five input/output terminals RCHK, IX$^+$, OX$^-$, IY$^+$ and OY$^{31}$, which are connected to electronic switches 33 through 37 for switching between the terminals and internal circuits of the microcomputer. The electronic switches 33 through 37 individually operate under the control of the microcomputer 11 to switch the connections between the above-mentioned terminals and the internal circuits of the microcomputer 11.

Reference numerals 60 and 61 denote a pair of opposed X- and Y-coordinate resistance sheets forming the tablet sheet 6 in FIG. 1. The X- and Y-coordinate resistance sheets 60 and 61 are coated uniformly over the entire areas of their opposed surfaces with resistance layers and they are disposed adjacent to each other with a very small gap defined therebetween by dot-shaped spacers (not shown) printed on their opposed surfaces.

As shown in FIG. 2, the X-coordinate resistance sheet 60 has X-side positive and negative electrodes 60a and 60b formed along its opposite marginal edges in the X-direction. The X-side positive electrode 60a is connected to the terminal IX$^+$ of the microcomputer 11 and the terminal RCHK via a variable resistor $R_c$ serving as a reference resistor, whereas the X-side negative electrode 60b is connected to the terminal OX$^-$ of the microcomputer 11. The resistance value $r_c$ of the reference resistor $R_c$ is a known value adjusted to allow ease in the detection of the application of pressure to the tablet sheet 6 described later on and in the calculation of the contact resistance value $r_p$ of the tablet sheet 6.

The Y-coordinate resistance sheet 61 similarly has Y-side positive and negative electrodes 61a and 61b extending along its opposite marginal edges in the Y-direction. The Y-side positive electrode 61a is connected to the terminal IY$^+$ of the microcomputer 11, whereas the Y-side negative electrode 61b is connected to the terminal OY$^-$ of the microcomputer 11.

The microcomputer 11 of such a configuration operates in a contact resistance detection mode and an X- and Y-coordinate detection mode to detect the press on the tablet sheet 6 and the press-control state. These modes of operation will be described below.

In the contact resistance detection mode, the electronic switches 33 through 37 are actuated to connect the input/output terminals of the microcomputer 11 to its internal circuits. That is, the terminal RCHK is connected via the switch 33 to the power supply $V_{cc}$ to apply a reference detection voltage $V_{cc}$ to the X-side positive electrode 60a of the X-coordinate resistance sheet 60 via the reference resistor $R_c$. The terminals IX$^+$, OX$^-$ and IY$^+$ are connected to the input terminals AD1, AD2 and AD3 of the A/D converter 14 via the switches 34, 35 and 36, respectively, to detect potentials at the X-side positive and negative electrodes 60a and 60b of the X-coordinate resistance sheet 60 and the Y-side positive electrode 61a of the Y-coordinate resistance sheet 61. The remaining input/output terminal OY$^-$ is grounded via the electronic switch 37 to keep the Y-side negative electrode 61b of the Y-coordinate resistance sheet 61 at the ground level.

Figure 3:
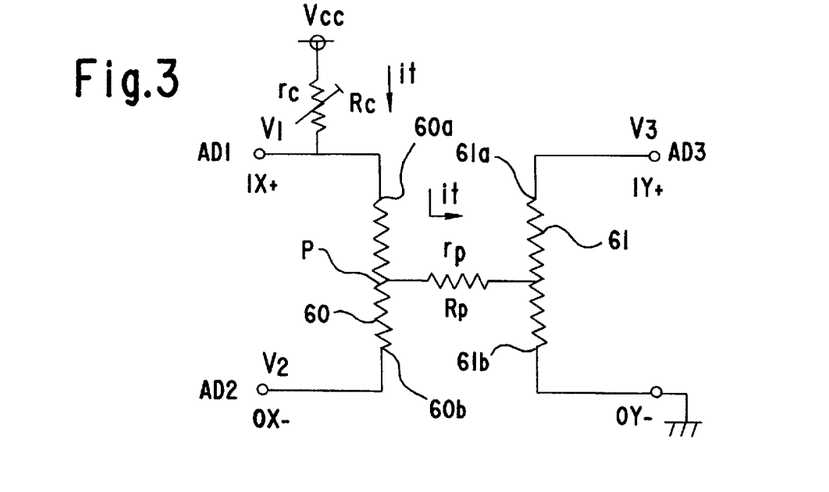
FIG. 3 is an equivalent circuit diagram of the FIG. 2 circuit, showing a contact resistance detecting mode.

FIG. 3 is an equivalent circuit diagram of the data processing part of FIG. 2 in the contact resistance detection mode. As shown in FIG. 3, when the X-coordinate resistance sheet 60 is pressed, a current it flows from the pressed position P on the X-coordinate resistance sheet 60 to the Y-coordinate resistance sheet 61 via a contact resistor $R_p$. At this time, since the input/output terminals IX$^+$, OX$^-$ and IY$^+$ are connected to the A/D converter 14, the same current it will flow through the reference resistor $R_c$ and the contact resistance $R_p$ if a minute current flowing toward the above-mentioned input/output terminals is ignored.

Thus, letting the potential difference across the reference resistor $R_c$ and the contact resistance $R_p$ be represented by first and second potential differences $V_A$ and $V_B$, respectively, and the resistance values of the reference resistor $R_c$ and the contact resistance $R_p$ by $r_c$ and $r_p$, respectively, the contact resistance value $r_p$ can be detected by $r_p = r_c * V_B / V_A$ from the relationship $V_A/r_c = V_B/r_p$.

As is evident from FIG. 3, the first potential difference $V_A$ can be calculated from the known reference detection voltage $V_{cc}$ and the potential $V_1$ at the input terminal AD1 of the A/D converter 14, and the second potential difference $V_B$ can be calculated from the potentials $V_2$ and $V_3$ at the input terminals AD2 and AD3 of the A/D converter 14. Accordingly, the contact resistance value $r_p$ can be derived from $r_p = r_c * V_B / V_A$ in a contact resistance detector.

The calculation of the contact resistance value $r_p$ is not affected by the current that flows in this mode. That is, even if the current flowing through the resistance sheets 60 and 61 varies with a change in the position of contact therebetween $(x_p, y_p)$, the contact resistance value $r_p$ can be detected independently of the current and hence, can be detected as a parameter entirely independent of the X- and Y-coordinates $(x_p)$ and $(y_p)$ of the contact position P. Thus, the contact resistance value $r_p$ will not change with the position on the tablet sheet 6 as long as it is pressed with the same force, and the contact resistance value $r_p$ can be changed by changing the strength of the force that is exerted on the control button 30, no matter which position on the tablet sheet 6 the force may be applied thereto.

The pointing device 10 according to this embodiment does not detect the tablet sheet press-control operation at all times, but instead it monitors the contact resistance value $r_p$ in the contact resistance detection mode and when the contact resistance value $r_p$ goes below a predetermined value (a press detecting threshold value), it judges that the tablet sheet 6 is being pressed. Thereafter, the pointing device 10 leaves the contact resistance detection mode and enters the X- and Y-coordinate detection mode to detect the tablet pressed position $(x_n, y_n)$.

When the tablet film sheet 60 is not pressed by the control button 30, the contact resistance value $r_p$ between the tablet film sheets 60 and 61 is infinity, but it goes down below a predetermined resistance value when the tablet film sheet 60 is pressed. By detecting this reduction in the resistance value $r_p$, it is decided that the tablet film sheet 60 is being pressed. In this embodiment, the above-mentioned predetermined resistance value (i.e. a press detecting threshold value $r_{Tp}$) is estimated at 1 KΩ from experimental values and the value $r_c$ of the reference resistor $R_c$ is set at 1 KΩ that is equal to the press detecting threshold value $r_{Tp}$. By setting the value $r_c$ of the reference resistor $R_c$ to be equal to the press detecting threshold value $r_{Tp}$, the press on the tablet sheet 6 can be detected simply by comparing the afore-mentioned first and second potential differences $V_A$ and $V_B$. That is, $r_c/r_p = r_{Tp}/r_p = V_A/V_B$, so that when the first potential difference $V_A$ exceeds the second potential difference $V_B$, the contact resistance value $r_p$ goes down below the press detecting threshold value $r_{TP}$, indicating the application of a force to the tablet sheet 6.

Upon detection of the application of a force to the tablet sheet 6, the microcomputer 11 detects the contact resistance value $r_p$ at the pressed position $(x_p, y_p)$ from $r_p = r_c * V_B / V_A$ as described above. Since the value $r_c$ of the reference resistor $R_c$ is preset at 1 KΩ, the contact resistance value $r_p$ is derived from the ratio between the first and second potential differences $V_A$ and $V_B$ and it is divided into five levels in terms of the ratio $V_A/V_B$ as shown in Table 1.

TABLE 1

| $V_A/V_B$ | less than 1 | 1~2 | 2~3 | 3~4 | not less than 4 |
|---|---|---|---|---|---|
| Contact Resistance Value $r_p$ (KΩ) | >1 | 0.5~1.0 | 0.33~0.5 | 0.25~0.33 | 0.25 |
| Corrective Constant C | — | 1 | 2 | 3 | 4 |

The contact resistance value $r_p$ thus divided into five levels is used to determine a corrective constant C described later on. A table that shows the relationship between the ratio $V_A/V_B$ and the corrective constant C is prestored in a ROM 16 connected to the microcomputer 11.

Upon detection of the contact resistance value $r_p$ following the detection of the press on the tablet sheet 6, the microcomputer 11 goes into the X- and Y-coordinate detection modes, in which to detect the pressed position P on the tablet sheet 6. The detection of the X- and Y-coordinates of the pressed position P is made by forming a potential gradient over the X- and Y-coordinate resistance sheets 60 and 61 alternately with each other. In the X-coordinate detection mode, the input terminal IX$_+$ is connected via the electronic switch 34 to the power supply $V_{cc}$ to apply the reference detection voltage $V_{cc}$ to the X-side positive electrode 60a of the X-coordinate resistance sheet 60 and the input/output terminal OX- is grounded via the electronic switch 35 to ground the X-side negative electrode 60b of the X-coordinate resistance sheet 60, thereby forming a uniform potential gradient over the X-coordinate resistance sheet 60.

On the other hand, the electronic switch 37 is disconnected from the input/output terminal OY- connected to the Y-side negative electrode 61b to prevent a current flow to the Y-coordinate resistance sheet 61 from the position P of its contact with the X-coordinate resistance sheet 60 and the input/output terminal IY$^+$ is connected via the electronic switch 36 to the input terminal AD3 of the A/D converter 14 to detect the potential at the contact position P from the Y-side positive electrode 61a of the Y-coordinate resistance sheet 61.

Since a uniform potential gradient is being formed over the X-coordinate resistance sheet 60, the X- coordinate $(x_p)$ of the contact or pressed position P can be calculated from a potential Vxp that is detected at the input terminal AD3 of the A/D converter 14.

After the detection of the X-coordinate, the microcomputer 11 is put in the Y-coordinate detection mode to detect the Y-coordinate of the pressed position P. That is, the reference detection voltage $V_{cc}$ is applied via the electronic switch 36 to the Y-side positive electrode 61a of the Y-coordinate resistance sheet 61 and the Y-side negative electrode 61b is grounded via the electronic switch 37, by which a uniform potential gradient is formed over the Y-coordinate resistance sheet 61. The electronic switch 35 is disconnected from the input/output terminal OX$^-$ connected to the X-side negative electrode 60b to prevent a current flow to the X-coordinate resistance sheet 60 from the position P of its contact with the Y-coordinate resistance sheet 61 and the input/output terminal IX$^+$ connected to the X-side positive electrode 60a is connected via the electronic switch 34 to the input terminal AD1 of the A/D converter 14 to detect the potential at the pressed position P from the X-side positive electrode 60a.

As in the case of the detection of the X-coordinate, the Y-coordinate $(y_p)$ of the contact position P is calculated from a potential Vyp detected at the input terminal AD1 of the A/D converter 14.

After repeating the detection of the X- and Y- coordinates $(x_p)$ and $(y_p)$ several times in the X- and Y-coordinate detection modes, the detected pieces of pressed position data $(x_p, y_p)$ are correlated to exclude those of abnormal values to obtain the pressed position data $(x_n, y_n)$.

Of the thus detected pieces of pressed position data $(x_n, y_n)$, the first detected pressed position data $(x_0, y_0)$ is temporarily stored as the reference position data $(x_0, y_0)$ in a RAM 17 connected to the microcomputer 11 until the control button 30 is released.

Then, the microcomputer 11 returns to the contact resistance detection mode. Thereafter, until the removal of the force exerted on the tablet sheet 6 is detected when the contact resistance value $r_p$ exceeds the threshold value $r_{Tp}$, the microcomputer 11 repeatedly enters and leaves the contact resistance detection mode and the X- and Y-coordinate detection modes to detect the contact resistance value $r_p$ at the pressed position and new pressed position data $(x_n, y_n)$.

Upon detection of the new pressed position data $(x_n, y_n)$, the microcomputer 11 calculates relative position data $(x_n - x_0, y_n - y_0)$ from the difference between the new pressed position data and the reference position data $(x_0, y_0)$. The relative position data $(x_n - x_0, y_n - y_0)$ is multiplied by the corrective constant C that is determined from the ratio $V_A/V_B$ and the table in the ROM 16 to obtain output data (X,Y), which is provided to a PC via an output port (not shown).

Figure 4A:
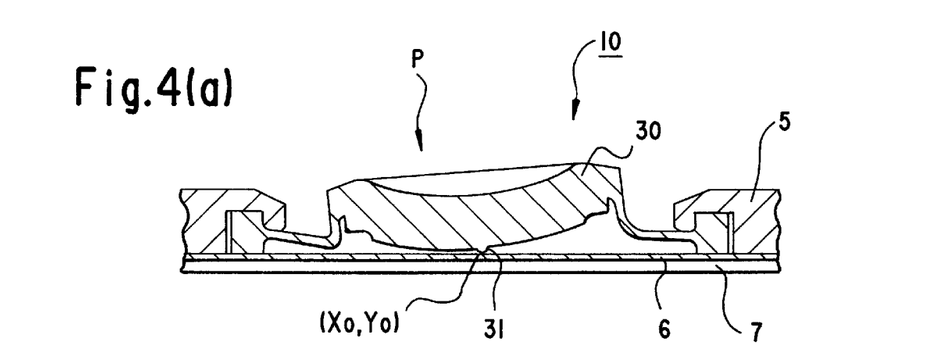
FIGS. 4(a) and 4(b) are sectional views of the principal part of the pointing device 10 for explaining its operations.
Figure 4B:
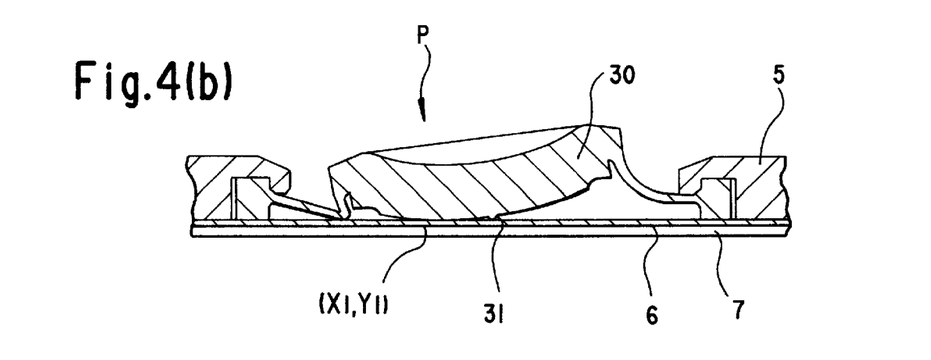

Turning now to FIG. 4, the operation of the pointing device 10 of the above configuration will be described. In its initial state the pointing device 10 is in the contact resistance detection mode to make a check to see if the tablet sheet 6 is being pressed.

When the control button 30 is depressed at a position $(x_1,y_1)$ off center in a direction in which to move the cursor as shown in FIG. 4(a), the control button 30 moves down in its entirety while tilting in that direction and the protrusion 31 from the underside of the button 30 presses first the tablet film sheet 60 into contact with the underlying tablet film sheet 61 at a position $(x_0,y_0)$ just under the protrusion 31. As a result, the contact resistance $r_p$ at the position of contact between the tablet film sheets 60 and 61 goes down below the press detecting threshold value $r_{Tp}$ and the ratio between the first and second potential differences $V_A$ and $V_B$ exceeds unity, indicating the application of a force to the tablet sheet 6.

Upon detection of the application of a force to the tablet sheet 6, the position of contact between the tablet film sheets 60 and 61 is detected as the position $(x_0,y_0)$ of the force exerted on the tablet sheet 6, that is, at the pressed position. Since the pressed position $(x_0,y_0)$ is the position where the tablet sheet 6 is pressed first, the pressed position $(x_0,y_0)$ is stored as the reference position $(x_0,y_0)$ in the RAM 17 until the force exerted on the tablet sheet 6 is removed therefrom.

Since the underside of the control button 30 is convex, continued pressing of the control button 30 at its off-center position will shift the pressed position $(x_n,y_n)$ in the direction from the position $(x_0,y_0)$ to $(x_1,y_1)$ as shown in FIG. 4(b).

The microcomputer 11 repeats the operations in the contact resistance detection mode and the X- and Y-coordinate detection modes, detecting the pressed position $(x_n,y_n)$ and the contact resistance value $r_p$ there every 500 msec. The contact resistance value $r_p$ is detected in terms of the ratio between the first and second potential differences $V_A$ and $V_B$ as described previously. The first potential difference $V_A$ is calculated from the difference between the reference voltage $V_{cc}$ and the potential $V_1$ at the input terminal AD1 of the A/D converter 14, and the second potential difference $V_B$ is calculated from the difference between the potentials $V_2$ and $V_3$ at the input terminals AD2 and AD3 of the A/D converter 14. Assuming that the control button 30 is pressed down relatively softly and that the contact resistance value $r_p$ at the pressed position is in the range of from 0.5 to 1 KΩ, the ratio $V_A/V_B$ is in the range of 1 to 2 and the microcomputer 11 sets the corrective constant C at "1" on the basis of the ratio $V_A/V_B$ and Table 1 called up from the ROM 16.

Next, the difference between the pressed position $(x_n,y_n)$ detected in the X- and Y-coordinate detection modes and the reference position $(x_0,y_0)$ is used to calculate the relative position data $(x_n{}^-x_0,y_n{}^-y_0)$.

The pointing device or tablet pointer 10 sequentially provides to the PC 1 pieces of output data produced by multiplying the relative position data $(x_n{}^-x_0,y_n{}^-y_0)$ by the corrective constant C. That is, the output data (X,Y) generated in response to the press of the control button 30 at the position $(x_1,y_1)$ is represented by $(C(x_1{}^-x_0),C(y_1{}^-y_0))$, but since the relative position data $(x_1{}^-x_0,y_1{}^-y_0)$ contained in the output data is indicative of the distance and direction from the center of the control button 30 to the position of the press thereon, that is, the direction and amount of tilt of the control button 30, the cursor moves on the PC display screen in the direction of tilt of the control button 30 at a speed corresponding to its amount of tilt. Since the corrective constant C is "1" as mentioned above, the relative position data $(x_1{}^-x_0,y_1{}^-y_0)$ is provided intact as the output data.

As long as the control button 30 is pressed with the same force at the position $(x_1,y_1)$ as shown in FIG. 4(b), the same output data $((x_1{}^-x_0),(y_1{}^-y_0))$ is provided every 500 msec, so that the cursor will move on the PC display screen in the direction corresponding to the direction of tilt of the control button 30 and at the speed corresponding to its amount of tilt. Thus, even if the manipulation area of the tablet sheet 6 is small, the cursor can be moved over a wide range in a single step.

When the control button 30 is pressed harder at the same position $(x_1,y_1)$, the relative position data $(x_1{}^-x_0,y_1{}^-y_0)$ remains unchanged but only the contact resistance value $r_p$ decreases. Provided that the contact resistance value $r_p$ went down to the range of 0.33 to 0.5 KΩ, the microcomputer 11 in the contact resistance detection mode refers to the table stored in the ROM 16 and sets the corrective constant C at "2." Consequently, the microcomputer 11 provides output data $(2(x_1{}^-x_0),2(y_1{}^-y_0))$ and the cursor moves at a speed twice higher than in the above. In other words, the speed of the cursor movement can be controlled only by changing the strength of force to be exerted on the control button 30.

As is evident from Table 1, this embodiment determines the corrective constant C in accordance with the control button pressing force or contact resistance value $r_p$ which is divided into four values, so that the cursor can be controlled to move with four different speeds. Incidentally, when the ratio $V_A/V_B$ is smaller than 1 as shown in Table 1, the contact resistance value $r_p$ does not drop to the button-depression detecting threshold value $r_{Tp}$, and consequently, no output data is generated and the corrective constant C is not determined, either. When the ratio $V_A/V_B$ went down below 1 in the contact resistance detection mode after the detection of the application of force, it is decided that the force applied to the control button 30 has been removed, and the pointing device 10 returns to its waiting mode.

The present invention is not limited specifically to the above-described embodiment but can be modified in various ways. For example, the relative manipulated variable input device of the present invention can be mounted in the PC housing or connected to the PC via a cable.

The relative manipulated variable input device of the present invention is also applicable, for example, to remote control of a TV receiver. In this case, the input device is mounted in the housing of a transmitter for remote control and output data representing the relative manipulated variable of the control button is sent by the transmitter to the TV receiver at a remote location for channel selection and volume adjustment, for instance.

While the present invention has been described above as being applied to control of the cursor movement, the invention is applicable as well to control of movements of characters or similar displayed on the display screen.

Moreover, in the above embodiment the corrective constant C is determined according to the contact resistance $r_p$ divided into four levels and the relative position data is multiplied by the corrective constant C to obtain the output data. However, it is also possible to employ a scheme that divides the relative position data by the contact resistance value $r_p$ and multiplies the resulting value by the predetermined constant C' to obtain the output data. The contact resistance value $r_p$ may also be contained as three-dimensional data in the output data together with the relative position data.

EFFECT OF THE INVENTION

According to the first aspect of the present invention, the cursor movement can be controlled by the direction and amount of tilt of the control button, and only by changing the strength of force applied to the control button can different output data be obtained corresponding to the force exerted on the button, even if the direction and amount of tilt of the button are held unchanged. This will enhance the degree of freedom for the input operation of the relative manipulated variable input device and hence, will improve its operability.

According to the second aspect of the present invention, since the output data is produced by multiplying the relative position data by the corrective constant C, the distance of travel of the cursor, to be controlled according to the output data, is in proportion to the corrective constant C and the speed of the cursor movement can be controlled by changing the strength of force that is applied to the control button. Hence, the cursor can also be moved faster by pressing the control button hard and the cursor can be moved by a simple operation to a desired position on the display.

It will be apparent that many modifications and variations may be effected without departing from the scope of the novel concepts of the present invention.

What is claimed is:

1. A relative manipulated variable input device comprising:

a tablet sheet formed by a pair of opposed tablet film sheets and disposed in parallel with a very small gap defined therebetween;

a control button disposed above said tablet sheet so that, when tilted in a desired direction while being depressed, said control button presses said tablet sheet continuously at different positions;

position detecting means for detecting, as a pressed position, a position of contact between said pair of tablet film sheets by depression of said control button;

contact resistance detecting means for detecting a contact resistance value at said pressed position; and reference position setting means for storing a first pressed position of said tablet sheet as a reference position at least until a force applied to said control button is removed, wherein output data, representing a direction and an amount of tilt of said control button when said button is depressed, is generated using said contact resistance value and relative position data calculated from a difference between said pressed position and said reference position.

2. The relative manipulated variable input device of claim 1, wherein said output data is generated by multiplying said relative position data by a corrective constant determined by said contact resistance value.

* * * * *